(12) United States Patent
Gong et al.

(10) Patent No.: US 8,943,011 B2
(45) Date of Patent: Jan. 27, 2015

(54) METHODS AND SYSTEMS FOR USING MAP-REDUCE FOR LARGE-SCALE ANALYSIS OF GRAPH-BASED DATA

(75) Inventors: Nan Gong, Solna (SE); Jari Koister, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 255 days.

(21) Appl. No.: 13/494,594

(22) Filed: Jun. 12, 2012

(65) Prior Publication Data

US 2013/0024412 A1 Jan. 24, 2013

Related U.S. Application Data

(60) Provisional application No. 61/502,040, filed on Jun. 28, 2011.

(51) Int. Cl.
  *G06N 5/00* (2006.01)
  *G06F 1/00* (2006.01)

(52) U.S. Cl.
  CPC ........................................ *G06N 5/00* (2013.01)
  USPC ................................ 706/46; 702/19; 707/760

(58) Field of Classification Search
  CPC ......... G06Q 10/00; G06N 5/02; G06N 5/022; G06N 5/04
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Jeffrey A Gaffin
*Assistant Examiner* — Kalpana Bharadwaj
(74) *Attorney, Agent, or Firm* — Dergosits & Noah LLP; Todd A. Noah

(57) ABSTRACT

Embodiments are described for a method for processing graph data by executing a Markov Clustering algorithm (MCL) to find clusters of vertices of the graph data, organizing the graph data by column by calculating a probability percentage for each column of a similarity matrix of the graph data to produce column data, generating a probability matrix of states of the column data, performing an expansion of the probability matrix by computing a power of the matrix using a Map-Reduce model executed in a processor-based computing device; and organizing the probability matrix into a set of sub-matrices to find the least amount of data needed for the Map-Reduce model given that two lines of data in the matrix are required to compute a single value for the power of the matrix. One of at least two strategies may be used to computing the power of the matrix (matrix square, $M^2$) based on simplicity of execution or improved memory usage.

22 Claims, 9 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0275902 A1* | 11/2008 | Burges et al. ................. 707/102 |
| 2009/0063415 A1 | 3/2009 | Chatfield et al. |
| 2011/0173189 A1* | 7/2011 | Singh et al. ................... 707/722 |
| 2012/0278261 A1* | 11/2012 | Lin et al. ......................... 706/12 |

* cited by examiner

$$\begin{array}{c c c c c} & 0 & 1 & 2 & 3 \\ 0 & 1 & .5 & .3 & .2 \\ 1 & .5 & 1 & .5 & 0 \\ 2 & .3 & .5 & 1 & 0 \\ 3 & .2 & 0 & 0 & 1 \end{array}$$

504

$$\begin{array}{c c c c c} & 0 & 1 & 2 & 3 \\ 0 & 1 & .5 & .3 & .2 \\ 1 & .5 & 1 & .5 & 0 \\ 2 & .3 & .5 & 1 & 0 \\ 3 & .2 & 0 & 0 & 1 \end{array}$$

FIG. 5

METHODS AND SYSTEMS FOR USING MAP-REDUCE FOR LARGE-SCALE ANALYSIS OF GRAPH-BASED DATA

CLAIM OF PRIORITY

This application claims the benefit of U.S. Provisional Patent Application 61/502,040 entitled USING MAP-REDUCE FOR LARGE SCALE ANALYSIS OF GRAPH-BASED DATA, by Nan Gong and Jari Koister, filed Jun. 28, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to graph processing, and more specifically to implementing Markov clustering techniques using a Map-Reduce model in a distributed computing environment to execute graph-based algorithms.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As social networks have gained in popularity, maintaining and processing the social network graph information using graph algorithms has become an essential source for discovering potential features of the graph. In general, a graph is a mathematical structure comprising an ordered pair $G=(V, E)$, where V is the set of vertices or nodes represent objects, and the elements in set E are edges or lines which represent relationships among different objects. Many real world problems can be abstracted into graph problems, such as, social networks and traffic networks. The great increase in the size and scope of social networks and other similar applications has made it virtually impossible to process huge graphs on a single machine in a "real-time" level of execution.

Many different graph-based algorithms have been proposed, covering graph construction, ranking, clustering, path problems, and so on. Most graph-based algorithms can be categorized into two classes: vertex-oriented and edge-oriented. Vertex-oriented algorithms, such as the vertex filter focus on the value of vertex and the data of each vertex is usually processed separately with no message passing from one vertex to another. If the main part of an algorithm is to compute the states of edges or to perform message transmitting, (e.g. PageRank), the algorithm is considered to be edge-oriented. Most edge-oriented algorithms can be solved in a vertex-centric way. However, in distributed computing environments, the high volume of network traffic can became a serious problem when perform edge-oriented algorithms on a vertex-oriented infrastructure. The cause of this problem is that data of a graph is stored in a vertex manner, and if the state of an edge is modified by one of its associated vertices (which occurs often in an edge-oriented algorithm) the other vertex must be notified to share the new state of the edge. If the two vertices are not located on same machine, network traffic will be generated.

The scale of the graphs in many practical problems such as social networks, web graphs and document similarity graphs can be on the order of millions to billions of vertices and trillions of edges. Distributed computing techniques have been applied to graph computations in order to more efficiently process graph data. One example is Map-Reduce, which is a distributed computing model introduced by Google® that processes large data sets on clusters of computers in parallel using the principles of map and reduce functions commonly used in functional programming. One iteration of map and reduce functions is called a Map-Reduce job. A job is submitted to the master node of a machine cluster and the master node divides the input data into several parts and arranges a number of slave machines to process these input data partitions. In an example implementation, a graph is split into blocks and taken as input of map function. In the map function, the value of each vertex is divided by the edge number of that vertex, and the result is stored as key/value pair {neighbor ID, result}. Before the reduce function, each machine fetches a certain range of key/value pairs onto its local storage, and performs a reduce function on each key value. In this example, the reduce function reads all of values under the same key (vertex ID), sum them up, and write the result back as the new value of this vertex. Hadoop by Apache, is an open source implementation of Map-Reduce model that is considered a good platform for graph-related processing. Besides the Map-Reduce function, it also provides a Hadoop Distributed File System (HDFS) and has become a popular infrastructure for cloud computing. However, the Hadoop project is still in development and exhibits shortcomings in the areas of job management, robustness and so on.

Vertex-oriented algorithms, which have a flat data model fit well on the Map-Reduce model, but edge-oriented ones do not fit as well. This is due to that the edge-oriented algorithms usually need to share the states of edges among multiple vertices, and Map-Reduce is a "share nothing" model that is inherently weak on edge-oriented algorithms. The algorithms that can be presented as matrices problems are possible to be implemented on Hadoop. However, because of the locality problem and overhead caused by Hadoop itself, the performance is not guaranteed to be high compared to other solutions model infrastructure. Moreover, Hadoop does not guarantee data locality, as it will try to process the file block locally, but when local processing slots are occupied, then local file blocks may be processed by other machines.

Although many real world problems can be modeled using Map-Reduce, there are still many that cannot be presented very well using this framework. Furthermore, the Map-Reduce model has certain weaknesses that limit its effectiveness with regard to certain important applications, such as cloud computing and social network environments. For example, Map Reduce cannot share information among different slave machines when running map or reduce functions, and not all graph-based algorithms can be mapped onto Map-Reduce; and for certain graph related problems that can be solved by Map-Reduce, the solutions may not be optimum for certain applications (e.g., cloud computing). Increased scalability is another key concern in the development and application of graph processing systems.

What is needed is an effective and efficient way to reformulate Markov clustering technique, and make it possible to be solved on Map-Reduce platforms efficiently.

BRIEF SUMMARY

In an embodiment and by way of example, there are provided mechanisms and methods for processing graph data by executing a Markov Clustering algorithm (MCL) to find clusters of vertices of the graph data, organizing the graph data by column by calculating a probability percentage for each column of a similarity matrix of the graph data to produce column data, generating a probability matrix of states of the column data, performing an expansion of the probability matrix by computing a power of the matrix using a Map-Reduce model executed in a processor-based computing device; and organizing the probability matrix into a set of sub-matrices to find the least amount of data needed for the Map-Reduce model given that two lines of data in the matrix are required to compute a single value for the power of the matrix. In an embodiment one of at least two strategies may be used to computing the power of the matrix (matrix square, $M^2$) based on simplicity of execution or improved memory usage. The Map-Reduce model is implemented in a distributed computing environment using the Hadoop distributed file system so that large scale graphs may be processed using organized arrays of workstation computers, each performing calculations of portions of the input graph.

Any of the described embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 4 illustrates an example of a number of sub-matrices generated by splitting a matrix, under an embodiment.

FIG. 5 illustrates two different ways of performing element calculations for example matrices in an MCL method, under an embodiment.

DETAILED DESCRIPTION

Systems and methods are described for implementing the Map-Reduce framework through a Markov Clustering algorithm to solve large-scale graph problems. Aspects of the one or more embodiments described herein may be implemented on one or more computers executing software instructions. The computers may be networked in a client-server arrangement or similar distributed computer network, and one or more of the networked computers may execute application programs that require periodic testing to ensure continuing functionality.

Figure 1:
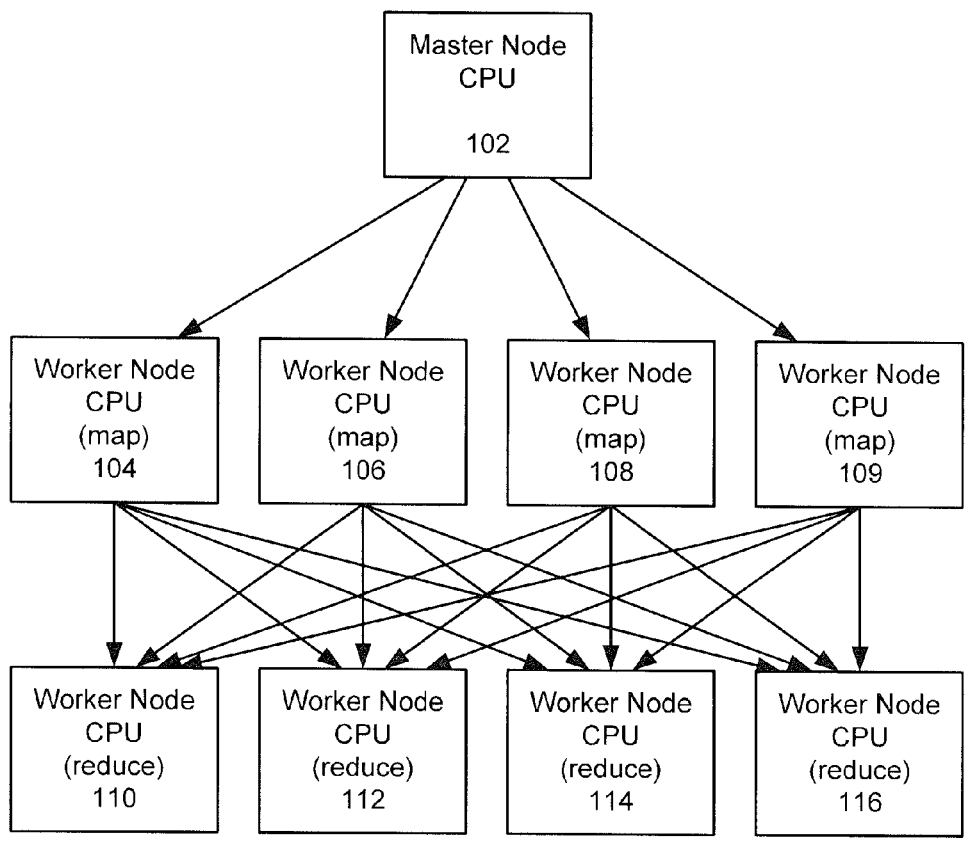
FIG. 1 is a diagram of a computer network that implements embodiments of a density-based clustering algorithm using Map-Reduce to solve large-scale graph problems.

FIG. 1 is a diagram of a computer network that implements embodiments of a density-based algorithm using Map-Reduce to solve large-scale graph problems. The system 100 of FIG. 1 implements a Map-Reduce model to solve large-scale graph problems. It also implements a reformulated version of the Markov Clustering Algorithm (MCL). Each node of system 100 represents a processor-based device or "machine" that may be embodied in a computer, workstation, server, client, mobile communication device, smartphone, tablet computer, laptop computer, or any other processor-based computing device. Each machine comprises a CPU (central processing unit) for execution of software instructions, and may include or be coupled to memory and one or more data stores. Each machine may also execute resident programs embodying client and/or server side embodiments of the density-based algorithm using Map-Reduce.

Map-Reduce is a distributed computing model that processes large data sets on clusters of computers in parallel. It provides a programming model which users can specify a map function that processes a key/value pair to generate a set of intermediate key/value pairs, and a reduce function that merges all intermediate values associated with the same intermediate key. FIG. 1 illustrates an embodiment in which system 100 comprises a master node and a number of worker nodes arranged in a two-tier centralized control model, though other arrangements are possible. For the embodiment of FIG. 1, to implement Map-Reduce, the master node 102 takes the input, partitions it up into smaller sub-problems, and distributes them to any number of worker map nodes 104 to 109. This constitutes the "map" step, and some of the worker nodes may do this again in turn. In the reduce step, the master node 102 assigns a certain range of keys, which are collected from the map stage to each reduce worker 110-116. Then every worker with a reduce task fetches answers of sub-problems from other workers according to the keys and combines them to form the output. In general, Map-Reduce allows for distributed processing of the map and reduction operations.

Each node or "machine" of network 100 includes a respective execution component for the density-based algorithm using Map-Reduce, such that the original large graph is partitioned into a number of smaller partitions and each partition is processed using a single machine of the network. The number and size of partitions can be selected based on the number of machines in the network, and can be determined based on a random or rule-based selection process. It should be noted that the system 100 is intended to be an example of a multi-processor or multi-machine network that processes large graphs using the density-based algorithm using Map-Reduce, and that any appropriate network topography may be used depending on the constraints and requirements of the graph or application being processed.

Clustering algorithms are widely used by designers and developers to solve many practical problems such as categorizing data, providing recommendations and so on. Clustering algorithms are used to find clusters in a data set. The data in the same cluster have a similar pattern. In general, for clustering on a graph, the cluster is defined as a subset of vertices in the graph, and the elements in one cluster are strongly connected to each other.

The Markov Clustering Algorithm (MCL) is a graph clustering algorithm that finds out the clusters of vertices by simulating random walks using matrices computation. MCL is based on the property that if there exist clusters in a graph, then the number of links within a cluster will be more than the number of links between different clusters. The basic premise is that if you start traveling randomly on the graph from one vertex, the end point you arrive at is more likely to be in the same cluster. This is the basic principle of MCL using for clustering. By using a random walk, it is possible to find out the clusters on the graph according to where the flow is concentrated. The random walk is simulated and calculated in MCL by using Markov Chain which is presented as a sequence of states $X_1$, $X_2$, $X_3$, etc. Given a present state, the past and future states are independent, which means that the next state of system depends only on the current state of system. This property can be formally described as below:

$$Pr(X_{n+1}=x|X_1=x_1,X_2=x_2,X_3=x_3,\ldots,X_n=x_n) = Pr(X_{n+1}=x|X_n=x_n)$$

The function Pr is used to compute the state (probability value) in a Markov Chain. Given state sequence $X_1$ to $X_n$, the state $X_{n+1}$ can be calculated by Pr. However, Pr will get the same state value for $X_{n+1}$ by only using $X_n$ as input. This means that the value of state $X_{n+1}$ only depends on state $X_n$. In MCL, the states are represented as probability matrix. The vertex in a graph can be considered as a vector. Edges of the vertex can be seen as an element of a vector. Putting all of the vectors of nodes in the graph together by column, a matrix which shows the connectivity of graph will be formed. In this matrix, if the value of each element indicates the possibility to "walk" through a certain edge, then it is called probability matrix.

Figure 2:
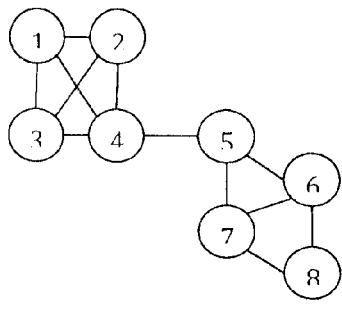
FIG. 2 illustrates the construction of an example probability matrix for use in an MCL process, under an embodiment.

FIG. 2 illustrates the construction of an example probability matrix for use in an MCL process, under an embodiment. As shown in FIG. 2, the graph 202 is constructed by eight vertices, numbered 1-8. Each vertex has several edges connected to other vertices. Assuming uniform probabilities on all edges while traveling from one vertex to another (including self loops), the probability matrix should looked like matrix 204, where the sum value of each column is exactly 1.

By taking power of the probability matrix, MCL will act a random walk to allow the flow going between vertices which are not directly connected. Taking the graph 202 in FIG. 2 as an example, after matrix multiplication, the value in column 1 row 5 would be 0.005, this shows that there is a flow from vertex 1 to vertex 5 after a random walk. This operation is called 'expansion' in MCL. As discussed before, a random walk is much more likely to stay in a densely linked part of the graph than cross a boundary, which will have sparse edges. However, after an extended period of random walk, this characteristic will be weakened. The purpose of MCL is to find clusters in the graph, in other words, to make sure random walks stay in cluster. Using expansion only does not achieve this goal.

After taking powers of the probability matrix, the values will be higher for those that are within clusters, and lower between the clusters. Another operation of MCL called 'inflation' strengthens the connections between vertices that are already strong and further weakens weak connections. Raising the power (exponent larger than 1) of each value in the matrix will make this gap even greater. Taking the power of each element in a matrix is also known as the Hadamard power. In the end of the inflation process, the probability (percentage) is recalculated column by column, and the sum value of each column is then again equal to unity. The exponent parameters here will influence the result of the clustering, with larger exponent values resulting in more and smaller clusters. Repeating execution of expansion and inflation will separate the graph into several parts without any links between them. Those connected vertices stay in a partition represent a cluster according to the MCL algorithm computation.

Embodiments are directed to a system that implements MCL using Map-Reduce as a model that can accelerate the clustering calculation of large graphs. As stated above, the MCL algorithm can be decomposed into matrix computation processes, thus an original problem can be represented as iterations of N*N matrix square and Hadamard power of matrix. In most practical problems, such as social or web networks, almost all of the vertices in the graph have edges linked to other vertices, which means that, in a probability matrix or connectivity matrix, almost all of rows and columns have values. Assume there are 1 million vertices in the graph, and each vertex has 100 edges connected to other vertices in average, in such a case, the connectivity matrix would be huge and extremely sparse. Embodiments directed to implementing MCL on a Map-Reduce model thus involve determining how to compute a sparse matrix using Map-Reduce. More specifically, the problems are: how to express a matrix for MCL problem; how to compute power of a matrix in a manner that scales; how to compute Hadamard power of matrix in a scalable way; and how to compose the solutions of problem above to make MCL work on a Map-Reduce model.

Figure 3:
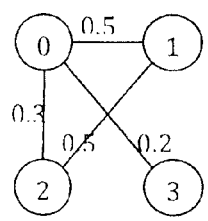
FIG. 3 is an example illustrating the construction of a probability matrix for an MCL process using Map-Reduce, under an embodiment.

The first step of the entire MCL computation procedure is the construction of a probability matrix. FIG. 3 is an example illustrating the construction of a probability matrix for an MCL process using Map-Reduce, under an embodiment. As shown in FIG. 3, a weighted similarity graph 302 is converted into a similarity matrix 304. By calculating the probability percentage on each column of the similarity graph, the probability matrix 306 is generated. As can be seen, the similarity matrix 304 is symmetric, but the probability matrix 306 is not.

To present a sparse matrix, a common method stores only non-zero value elements and their index values. Skipping all zero values in a sparse matrix keeps the physical storage size of the matrix smaller as compared to the simple method of storing all values of the matrix regardless of value. Using this method to describe the probability matrix 306 in FIG. 3, the matrix can be explained in two different ways:
1. ColumnID:RowID:Value
   {0:0:0.5, 0:1:0.25, 0:2:0.15, 0:3:0.1, 1:0:0.25, 1:1:0.5, 1:2:0.25, 2:0:0.17, 2:1:0.28, 2:2:0.56, 3:0:0.17, 3:3:0.83}
2. ColumnID=>{RowID:value*}
   Column 0=>{0:0.5, 1:0.25, 2:0.15, 3:0.1}
   Column 1=>{0:0.25, 1:0.5, 2:0.25}
   Column 2=>{0:0.17, 1:0.28, 2:0.56}
   Column 3=>{0:0.17, 3:0.83}

The first method shown above provides full accessibility to individual elements in a matrix using column and row indices. In the second method, the whole column of data will be retrieved first, then the row index is used to find the corresponding value. This second method takes less storage space than the first because it records each column index only once. In case of MCL, data is loaded by row and column, thus the second method will most benefit the performance both on processing time and storage space.

In addition to the two methods of representing the matrix above, another matrix process operation includes splitting the matrix into several sub-matrices. FIG. 4 illustrates an example of a number of sub-matrices generated by splitting a matrix, under an embodiment. As shown in FIG. 4, a 5×5 size matrix 400 is split into several sub-matrices 402, which are each of size 2×2. The matrices that reside at the end of columns and rows are not full size sub-matrices. Each sub-matrix has its own ID in format of (columnNumberOfSub-Matrix, rowNumberOfSubMatrix). Using the sub-matrices to describe the matrix in FIG. 3 with sub-matrix size 2×2, results in the following:

3. Sub-Matrix (columnNumOfSubMatrix, rowNumOf-SubMatrix)=>{localColumnID:localRowID:value*}
   Sub-Matrix (0, 0)=>{0:0:0.5, 0:1:0.25, 1:0:0.25, 1:1:0.5}
   Sub-Matrix (0, 1)=>{0:0:0.15, 0:1:0.1, 1:0:0.25}
   Sub-Matrix (1, 0)=>{0:0:0.17, 0:1:0.28, 1:0:0.17}
   Sub-Matrix (1, 1)=>{0:0:0.56, 1:1:0.83}

It should be noted that each sub-matrix is using its own index to the element, not the global index. However, the indices used by sub-matrices and global indices can be transformed via the following equations:

$C = c + n * \text{columnNumberOfSubMatrix}$ $R = r + n * \text{rowNumberOfSubMatrix};$ where, C and R indicate the global indices of rows and columns of elements in the matrix, and c, r together are local indices which show the positions of elements in sub-matrices. The number n is the length of vector in a sub-matrix which means that the size of a sub-matrix is n×n. Given global indices, local indices in sub-matrices can be easily calculated using the following method:

$\text{columnNumberOfSubMatrix} = \text{floor}(C/n);$ $\text{rowNumberOfSubMatrix} = \text{floor}(R/n);$ $c = C - n * \text{columnNumberOfSubMatrix} = C - n * \text{floor}(C/n);$ $r = R - n * \text{rowNumberOfSubMatrix} = R - n * \text{floor}(R/n);$ The expansion operation of the MCL algorithm is essentially computing the power of a matrix. The power of the probability matrix is taken in order to make the random walk flow expanded. In general, the power of a matrix is computed as following: If $a_{ij}$ is an element of matrix M and $b_{ij}$ is an element of $M^2$, then $b_{ij} = \Sigma_{k=0}^{n} = a_{ik} a_{kj}$ (i is row, and j is colume).

To compute a value in matrix $M^2$, one row and one column of values in matrix M are needed. In a parallel or distributed computing environment, sharing data has become an essential problem. This is especially true in Map-Reduce, which is a "share nothing" model when performing the map tasks or performing reduce tasks. Thus, reducing data sharing as much as possible is a critical issue in Map-Reduce algorithm implementations. Since two lines of data in matrix are needed to compute a single value in taking power of matrix, reusing the data which has been used to compute another value is an important strategy.

FIG. 5 illustrates two different ways of performing element calculations for example matrices in an MCL method, under an embodiment. Assume four values need to be calculated in $M^2$. As shown in FIG. 5, the least number of data needed is four vectors in matrix M when these four values are given in format as a 2×2 matrix 502. If these values stay in line as shown in 503, then five vectors of data in M will be needed to calculate them. Thus, splitting the computation target matrix into several square sub-matrices is the best way to scale up the matrix computation. While computing the power of a matrix, to calculate one value needs all of the values from its column and its row. If the matrix $M^2$ in divided into four sub-matrices, half of columns and rows will be read to compute one quarter of $M^2$. In the view of a single element, it will be read 4 times during the whole procedure of calculating matrix $M^2$. If the matrix is split into s×s parts, then a single element in matrix M will be duplicatively read 2×s times compared to before division.

Using sub-matrices, an MCL algorithm using Map-Reduce may use one of two strategies for calculating the matrix square. With regard to these strategies, the following values are defined: N is the number of vertices in the graph, thus, the size of matrix is N×N; n is the number of rows and columns in a sub-matrix, then the size of sub-matrix is n×n; if N mod n=0, p=N/n, otherwise, p=ceiling (N/n), which means that the matrix will be divided into p×p sub-matrices.

Under an embodiment, a first strategy uses a simple rule to decompose the work into map and reduce functions during all stages of the algorithm designs: (1) no matter which kind of data was taken as input of map function, perform analysis on the data as much as possible until no further result can be achieved; (2) combine the results using particular keys, in order to make reducer be able to perform further analysis (the definition of the keys should also consider what kind of result the reducer could get; (3) if the work is not able to be done in one job, another job is needed, and no matter if work is done in one job or not, the output format of the reduce function should also be considered, in order to benefit the following analysis of data.

Before expansion, the data of matrix M is organized by column, and converted into probability matrix using Algorithm 1.1:

---
Algorithm 1.1: MarkovMatrix( )

Map-Reduce Input: connectivity (similarity)sparse matrix
Map-Reduce output: markov (probability) matrix
class MarkovMapper
    method map(column)
        sum=sum(column)
        for all entry ∈ column do
            entry.value=entry.value/sum
            collect {column.id, {out, entry.id, entry.value}}

---

Algorithm 1.1: MarkovMatrix( )

--- collect {entry.id, {in, column.id, entry.value}}
class MarkovReducer
    method reduce(key, list {sub-key, id, value}})
        newcolumn=Ø
        newrow=Ø
        for all element ∈ list do
            if sub-key is "out" then newcolumn.add({key, id, value})
            else newrow.add({id, key, value})
        collect newcolumn
        collect newrow

---

To convert the matrix into a probability matrix, the map function will read the matrix by column, and calculate the probability value of each element of the matrix, and then, collect the column ID or row ID as key, the probability as value. Reduce function fetches all of the values under a same key, and put it back to file system, in our case, the new rows and columns with probability values will be put back to file system. After that, the data probability matrix will look like the following:

Column 0 –> {0 0.5, 1 0.2, ... }

Column 1 –> {0 0.25, 1 0.5, ... }

...

Row 0 –> {0 0.5, 1 0.25, ... }

...

Figures 6, 7:
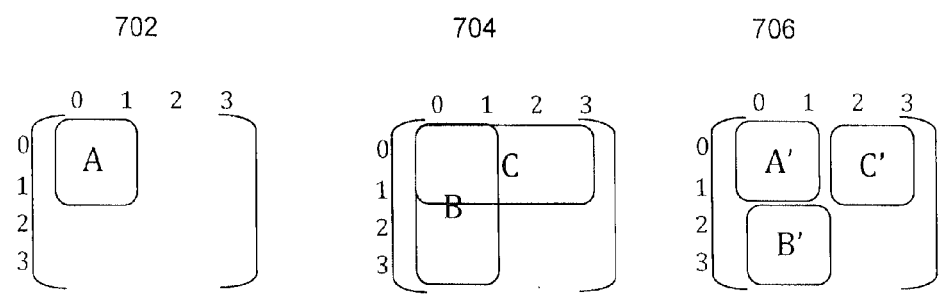
FIG. 6 illustrates an example of a sub-matrix calculation with information stored by column and row, under an embodiment.
FIG. 7 illustrates an example of a sub-matrix calculation using a second strategy, under an embodiment.

This data is output from execution of algorithm 1.1 and results in the storage of two full aspects of to probability matrix to be stored in memory, one by column and another by row. Each map task calculates one sub-matrix of $M^2$, so if the size of sub-matrix is n, the input of map task will be 2n lines of data, in other words, if the average number of elements in each column or row in matrix M is X, the number of input data (elements) will be 2nX. FIG. 6 illustrates an example of a sub-matrix calculation with information stored by column and row, under an embodiment. For the example shown in FIG. 6, matrix 600 comprises several 2×2 size sub-matrix blocks, and sub-matrix block (0, 0) will get Column 0, 1 and Row 0, 1 as the input of the map-reduce operation.

The expansion operation can be done in one iteration of map and reduce tasks. In the mapper, all of the elements contained in a particular sub-matrix can be simply calculated, and in the reducer, the results are re-organized by column to make them easy to use during the next stage (inflation). An example expansion process is provided in Algorithm 2.1 below:

---

Algorithm 2.1: expansion( )

---

Map-Reduce Input: markov matrix
Map-Reduce output: expanded matrix
class ExpansionMapper
    method map(column, row)
        sum=0
        for all entry ∈ column do
            if entry.id is contained in row.idSet then
                sum=sum+entry.value*row.get(id).value
            if sum!=0 then collect {column.id, row.id, sum}
class ExpansionReducer

---

Algorithm 2.1: expansion( )

--- method reduce(key, list {row, value}})
        newcolumn=Ø
        for all element ∈ list do
            newcolumn.add({key, row, value})
        collect newcolumn

---

In the map function, all of the columns and rows that are used to calculate a sub-matrix are read. Calculation is done by classic matrix multiplication method. The result will be collected using both column ID as key, row ID and new value of element as value. The reduce function gets all of values by column ID, and puts them back by columns. This method of computing power of matrix is straight-forward and low cost. However, it may result in duplicate storage of matrix data depending on the number of sub-matrices.

In an embodiment, a second strategy is formulated to improve the memory performance. The second strategy involves decomposing the sub-matrices of the matrix into several constituent parts. FIG. 7 illustrates an example of a sub-matrix calculation using a second strategy, under an embodiment. For the example of FIG. 7, sub-matrix A in $M^2$ 702 can be calculated by A=CB (B and C are left and top parts of matrix M 704), but this process can also be expressed as A=A'A'+C'B', where A', B' and C' are sub-matrices of M 706. According to this property, the calculation operation can be decomposed will require lower memory usage compared to the first strategy wherein the data of A' will stay in memory twice, i.e., in both horizontal and vertical vectors. In the second strategy, it is not necessary to store A' twice in memory and this part of the data can be reused in subsequent calculations. In the second strategy, the probability matrix is no longer required to be represented as both column and row format, only column style is required. Thus, for the second strategy, algorithm 1.1 can be simplified into Algorithm 1.2 below:

---

Algorithm 1.2: MarkovMatrix( )

---

Map-Reduce Input: connectivity (similarity)sparse matrix
Map-Reduce output: markov (probability) matrix
class MarkovMapper
    method map(column)
        sum=sum(column)
        for all entry ∈ column do
            entry.value=entry.value/sum
            collect {column.id, {entry.id, entry. value}}
class MarkovReducer
    method reduce(key, list {id, value}})
        newcolumn=Ø
        for all element ∈ list do
            newcolumn.add({key, id, value})
        collect newcolumn

---

The calculation of the sub-matrix is given as:

$$\text{SubMatrix}_{n+1,i,j} = \Sigma_{k=0}^{p} \text{SubMatrix}_{n,i,k} \text{SubMatrix}_{n,k,j}$$ (i is row, and j is colume)

If $\text{SubMatrix}_{n,i,k}\text{SubMatrix}_{n,k,j}$ is taken as unit of calculation, then each element in matrix M will be involved in 2(p−1) units of calculations. The result is called a unit of $\text{SubMatrix}_{n+1,i,j}$. In a sub-matrices' view, a sub-matrix $S_{ij}$ will be involved in computations of $S_{ij}S_{jk}$ (k=0 ... p−1) and $S_{ki}S_{ij}$ (k=0 ... p−1), also 2(p−1) times. Thus, each unit of calculation can be simply done and the sub-matrix can be computed by sum of certain units.

In an embodiment, the expansion process is given as shown in algorithm 2.2 below:

---
Algorithm 2.2: expansion( )
---

```
Map-Reduce Input: Markov matrix
Map-Reduce output: unit matrix
class ExpansionStepOneMapper
    method map(column)
        blockColID = floor (column.id / subMatrixSize)
        for all entry ∈ column do
            blockRowID = floor (entry.id / subMatrixSize)
            x=0
            do
                collect    {{blockColID,    x,
            blockRowID}, {column.id, entry.id, entry.value}}
                x=x+1
            while (x<p)
            x=0
            do
                if (x!= blockColID) then
                    collect {{x, blockRowID, blockColID},
                    {column.id, entry.id, entry.value}}
                x=x+1
            while (x<p)
class ExpansionStepOneReducer
    method   reduce   (key   {blockColID,   blockRowID,
    subBlockID}, list {col, row, value})
        matrix1, matrix2, matrix3=Ø
        for all element ∈ list do
            if blockRowID * n <= row< blockRowID * n + n and
            subBlockID * n <= col < subBlockID * n + n then
                matrix1.put({{col, row}, value})
            if blockColID * n <= col < blockColID * n + n
            and subBlockID * n <= row < subBlockID * n + n
                then matrix2.put({{col, row}, value})
        matrix3 = matrix1 * matrix2
        collect matrix3
Map-Reduce Input: unit matrix
Map-Reduce output: expended matrix
class ExpansionStepTwoMapper
    method map(matrix)
        for all element ∈ matrix do
            collect    {{matrix.columnID,    matrix.rowID},
            {element.col, element.row, element.value}}
class ExpansionStepTwoReducer
    method reduce (key {matrixColumnID, matrixRowID}, list
    {col, row, value}})
        matrix = Ø
        for all element ∈ list do
            matrix (list.col, list.row) = matrix (list.col,
            list.row) + list.value
        collect matrix
```

As shown in algorithm 2.2, the task is divided into two steps, one Map-Reduce job per step. The first job is used to calculate all of the units of sub-matrices. During the first step, data in M is read and sent to reducer using key {blockColID, blockRowID, subBlockID}, where blockColID and block-RowID together is the index of sub-matrix in $M^2$ which is to be calculated, and subBlockID indicates which unit of sub-matrix it is referred to. In the reducer, the data under one key will belong to the sub-matrices (columnID=subBlockID, rowID=blockRowID) or (columnID=blockColID, rowID=subBlockID) in M. After separation into two parts, multiplication of these two sub-matrices is performed. The result after first step will be different units of sub-matrices in $M^2$, stored in memory by the key given to reducer.

The second job is used to sum up the units that belong to the same sub-matrix, therefore, getting the result of expansion by sub-matrix. To compute the sub-matrices, in step 2, all of the units will be read and sent to the reducer according to the first two numbers of the key. The reducer will then simply sum up the received units of matrices.

In general, if an algorithm can be done in one job of the Map-Reduce process, then decomposing it into several jobs will usually cost more time on execution. This extra execution time mainly comes from the overhead of Map-Reduce infrastructure itself, including task creating and network transmitting latency. In an embodiment, a third strategy is implemented to integrate the two steps above. The third strategy utilizes a mechanism provided by Map-Reduce called a partitioner. The partitioner is defined to arrange the certain range of key-value pairs from map task output into specified reducer. By using it, all units of a sub-matrix will be calculated in one reducer. Then the additional work can be done in the reducer, instead of doing it in another iteration of map-reduce job. In this case, the expansion algorithm is modified as shown in algorithm 2.3 below:

---
Algorithm 2.3 expansion( )
---

```
Map-Reduce Input: Markov matrix
Map-Reduce output: expended matrix
class ExpansionMapper
    //same as class ExpansionStepOneMapper   in   Algorithm
    2.2
class ExpansionPartitioner
    method getPartition (key {blockColID, blockRowID,
    subBlockID}, list {col, row, value}})
        result = blockColID % numPartitions
        return result;
class ExpansionReducer
matrix1, matrix2, matrix3 = Ø
blockColIDBefore, blockRowIDBefore = Ø
method   reduce   (key   {blockColID,   blockRowID,
subBlockID}, list {col, row, value}})
    if    (blockColIDBefore    !=   blockColID    &
    blockRowIDBefore != blockRowID) then
        blockColIDBefore = blockColID
        blockRowIDBefore = blockRowID
        if (blockColIDBefore != Ø) then
            collect matrix3
    for all element ∈ list do
        if (blockRowID * n <= row< blockRowID * n + n
        and subBlockID * n <= col < subBlockID * n + n)
        then matrix1.put({{col, row}, value})
        if (blockColID * n <= col < blockColID * n + n
        and subBlockID * n <= row < subBlockID * n + n)
        then matrix2.put({{col, row}, value})
    matrix3 = matrix3 + matrix1 * matrix2
method cleanup( )
    if (blockColIDBefore != Ø) then
        collect matrix3
```

In this algorithm, the definition of the map function is the same as ExpansionStepOneMapper in Algorithm 2.2. However, partitioner is used to route result of map functions to proper reducer, in order to calculate the sub-matrices in one step (reducer). The data will be sent to reducers using the rule that is defined in the partitioner. The keys will be processed in a sorted order in reducers. Using these properties, one or more sub-matrices can be calculated in a single reducer, which means that the number of reduce tasks can be controlled flexibly. To compute multiple sub-matrix in single reducer, two parameters, blockColIDBefore and blockRowIDBefore, are needed. They are used to keep the sub-matrix ID that is processing. When the ID is changed, it means that the calculation of the former sub-matrix has finished, and the result of the former sub-matrix will be written back to the file system.

In an embodiment, the inflation step of MCL is performed using the Hadamard power of the matrix. Compared to computing square of a matrix, the Hadamard power is generally much easier to compute. Given a matrix, the Hadamard Power involves calculating the power of each element in the matrix. But the inflation step of MCL does not only contain a computation of Hadamard Power, but also requires the conversion of the powered matrix into a new probability matrix, in other words, to compute the percentage of each element by column. If any of strategies 1, 2 or 3 are used in the expansion step, inflation can be done during one Map-Reduce iteration. For strategy 1, the input data of inflation is given by format of column, so the inflation procedure can be done in the mapper, and the reducer is used to generate the data for the next round of map-reduce. This is shown in algorithm 3.1 below:

---
Algorithm 3.1 inflation( )
---
Map-Reduce Input: expanded matrix
Map-Reduce output: markov (probability) matrix
class InflationMapper
    method map(column,r)
        sum=sum(all column.entry.value^r)
        for all entry ∈ column do
            entry.value=entry.value^r/sum
            collect {column.id, {out, entry.id, entry.value}}
            collect {entry.id, {in, column.id, entry.value}}
class InflationReducer
    // same as the MarkovReducer in Algorithm 1.1
---

As shown in the pseudo code above, the data is read column by column in the map function. Each element of the column is taken to a power by a coefficient number 'r'. The new values in this column are then normalized, i.e., normalization means all of new values are divided by the sum of them, after that, the sum of these values is 1.

The output of strategy 2 and 3 are in format of sub-matrices, thus inflation cannot be done in mapper directly. However, the reducers can perform the inflation work while the mappers only read data from the file system and transfer it to the proper reducers by taking column ID as intermediate keys. An example implementation of this is shown as algorithm 2.3 below:

---
Algorithm 3.2 inflation( )
---
Map-Reduce Input: expanded matrix
Map-Reduce output: markov (probability) matrix
class InflationMapper
    method map(submatrix)
        for all entry ∈ submatrix do
            collect {entry.columnID, {entry.rowID, entry.value}}
class InflationReducer
    method reduce(columnID, list {rowID, value} )
        sum=sum(all list.value^r)
        for all {rowID, value} ∈ list do
            value=value^r/sum
            collect {columnID, {rowID, value}}
---

With regard to implementation of embodiments, when designing the algorithms for probability matrix calculation, expansion and inflation, the input and output data format should be considered. The output of probability matrix calculation and inflation is in the same format as the input of expansion. The output format of expansion is the same compared to the input of inflation. Thus, the designed module of algorithms can be combined into a Job Chain to achieve the clustering goal of MCL. In an embodiment, the composition of jobs looks like:
[MarkovMatrix Job]([Expansion Job][Inflation Job])+

The MarkovMatrix Job (i.e., probability calculation) will be run in the beginning, then, expansion and inflation will be performed in order. Expansion and inflation could be performed one or more times, until algorithm terminates through convergence.

In an example implementation, similarity graphs are used as the input of an MCL process, and the edges in the graphs are bidirectional and weighted. The weight of each edge is no smaller than 0 and no more than 1, which can represent the similarity of different vertices in the graph. Two kinds of structure of graph files are taken into consideration: a single file in which one file contains all of the information of the graph; and multiple files in which one file only contains information of one vertex, so that the number of files is equal to the number of vertices in the graph. In a single file, the graph is represented as:
<Vertex ID><Edge 1 ID><Edge 1 Weight><Edge 2 ID><Edge 2 Weight> . . . <Edge n ID><Edge n Weight>.

In the multiple file format, the ID of the vertex is used as the file name, and in the file, the graph will be shown as:
<Edge 1 ID><Edge 1 Weight><Edge 2 ID><Edge 2 Weight> . . . <Edge n ID><Edge n Weight>.

The benefit of using a single file is that it is the best way of Hadoop to process, because Hadoop is optimized to process small numbers of large files, but not a large number of small files. Using one file per vertex is good for the individual accessibility of vertices, but HDFS will have difficulty to solve too many files. As input where individual accessibility is not that important, using a single file is a better choice, although it may increase the complexity of file processing.

A customized splitter may be made for all of MCL implementations to store the files by block. For example, a sub-block is described as following:

---
<Column From, Column To>
<Column ID> <Row ID 1> <Value 1> <Row ID 2> <Value 2>...
<Row ID n> <Value n>
*
<Row From, Row To>
<Row ID> <Column ID 1> <Value 1> <Column ID 2> <Value 2>...
<Column ID n>
<Value n>*
<End>
or
<Sub-Block ID>
<Column> <Row> <Value> *
<End>
---

When the splitter reads the word "End", it means a block has finished. Therefore, multiple blocks can be stored into one file. The drawback of this format is that all of the values are stored in plain text. For a Double type value, which is 64 bits, it should only take 8 bytes in Sequential File Format, but in a Text File Format, it may be shown as 4.94065645841246544E-324, which is obviously much larger than 8 bytes. Thus the network volume is far higher than ideal.

In an embodiment, the MCL algorithm is implemented as a job chain of expansions and inflations. One job will be run in the beginning to produce the probability. After this step has been done, expansion and inflation will be applied alternately until termination. The intermediate result will be stored using block format on HDFS and be taken as the input for the next job.

There are two ways to decide the termination of algorithm: (1) when all of elements in the matrix are not changed; and (2) when the number of output records in reduce task is the number of vertices. The first termination method is the most accurate method to decide when MCL should terminate. However, comparing two huge matrices may take a lot of time. In the beginning, the elements in the intermediate results will change quite often, and it is not hard to compare two matrices, because once a changed element is found, the two matrices will be considered different. But when the algorithm is going to terminate, most elements in the matrix are fixed. To decide whether the matrix is changed or not, almost the entire two matrices will be read and compared. The second way of deciding whether or not to terminate uses the built-in counter feature of Hadoop, and does not cause any extra work load. However, this method can only be used in the situation where all of the elements will definitely converge to value 1. This is because if the algorithm converges with two or more non-unity values, the number of output values will be larger than the number of vertices.

Figure 8:
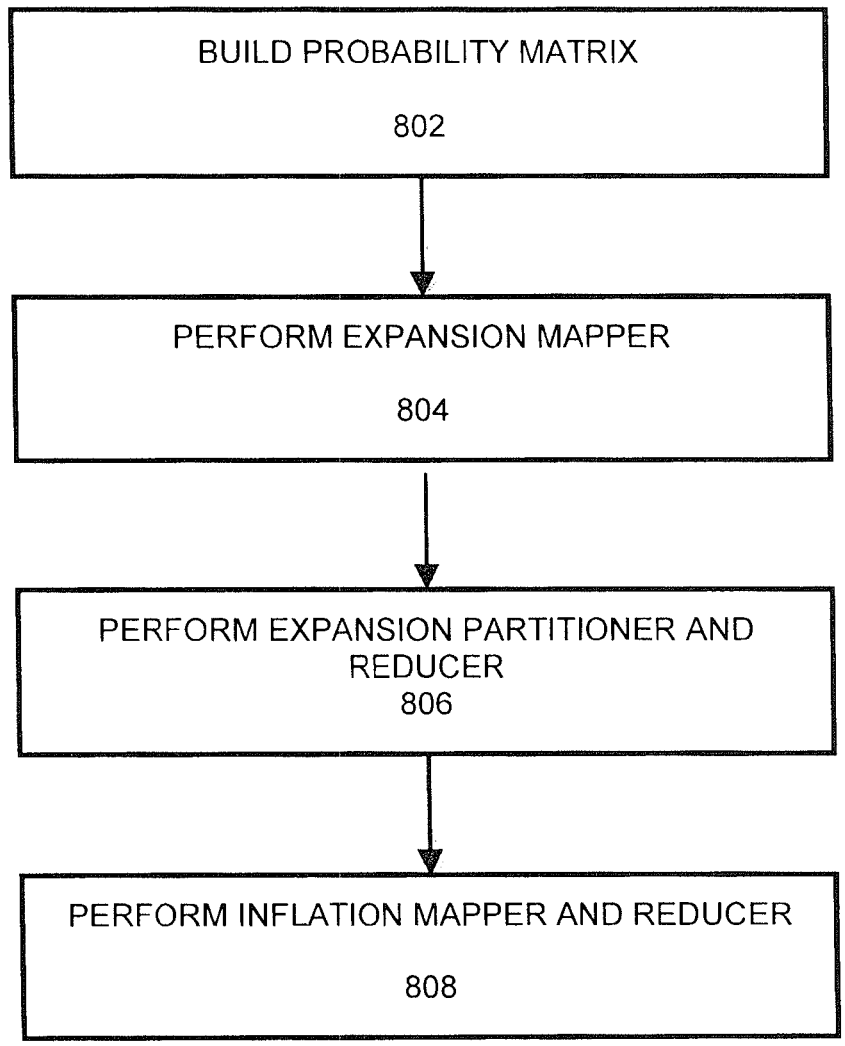
FIG. 8 is an overall block diagram illustrating a method of implementing an MCL algorithm using Map-Reduce, under an embodiment.

FIG. 8 is an overall block diagram illustrating a method of implementing an MCL algorithm using Map-Reduce, under an embodiment. As shown in FIG. 8, the process begins with the construction of the probability matrix, act 802. An expansion mapper process is then performed, act 804. An expansion partitioner and reducer process 806 in performed next and if followed by an inflation mapper and reducer process 808. The details of each processing block of FIG. 8 will be described with respect to the flowcharts that follow.

Figure 9:
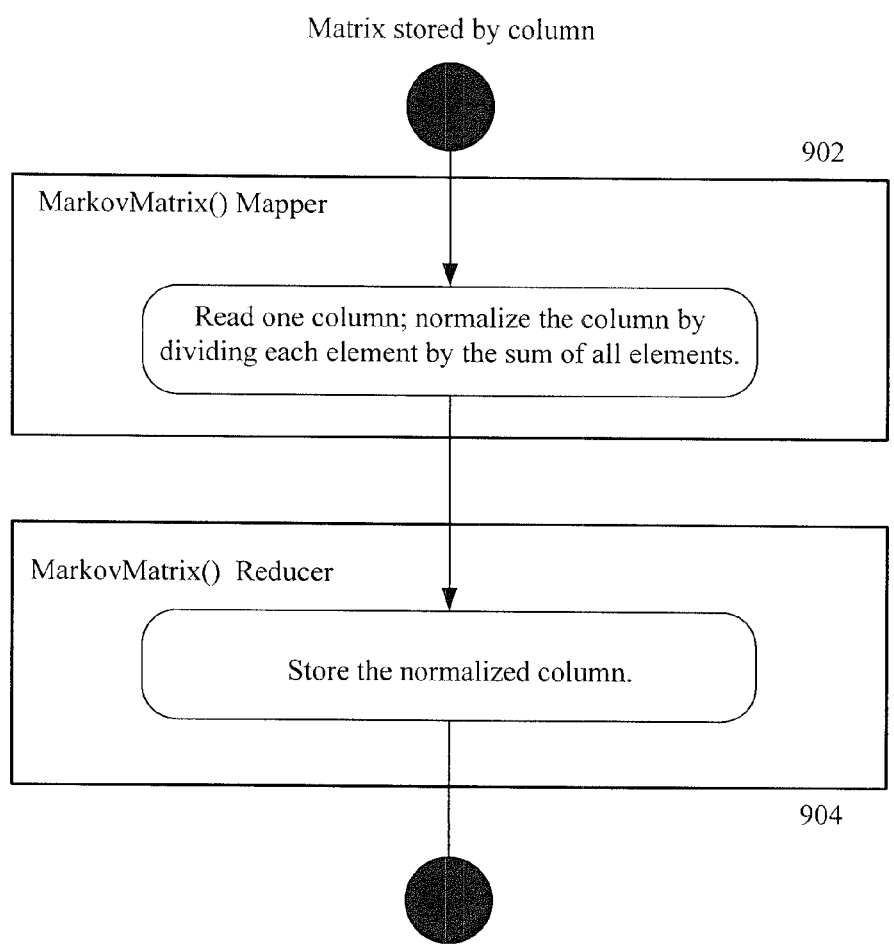
FIG. 9 is a diagram illustrating components and acts to build a probability matrix for an MCL algorithm using Map-Reduce, under an embodiment.

FIG. 9 is a diagram illustrating components and acts to build a probability matrix for an MCL algorithm using Map-Reduce, under an embodiment. The probability matrix is built using the Markov Matrix Mapper 902 and Markov Matrix Reducer 903 components. An input matrix stored by column is input to the matrix mapper 902. The matrix mapper reads the matrix data one column at a time, and normalizes each column by dividing each element by the sum of all the elements. The result is then sent to the matrix reducer 904. This process stores the normalized columns.

Figure 10:
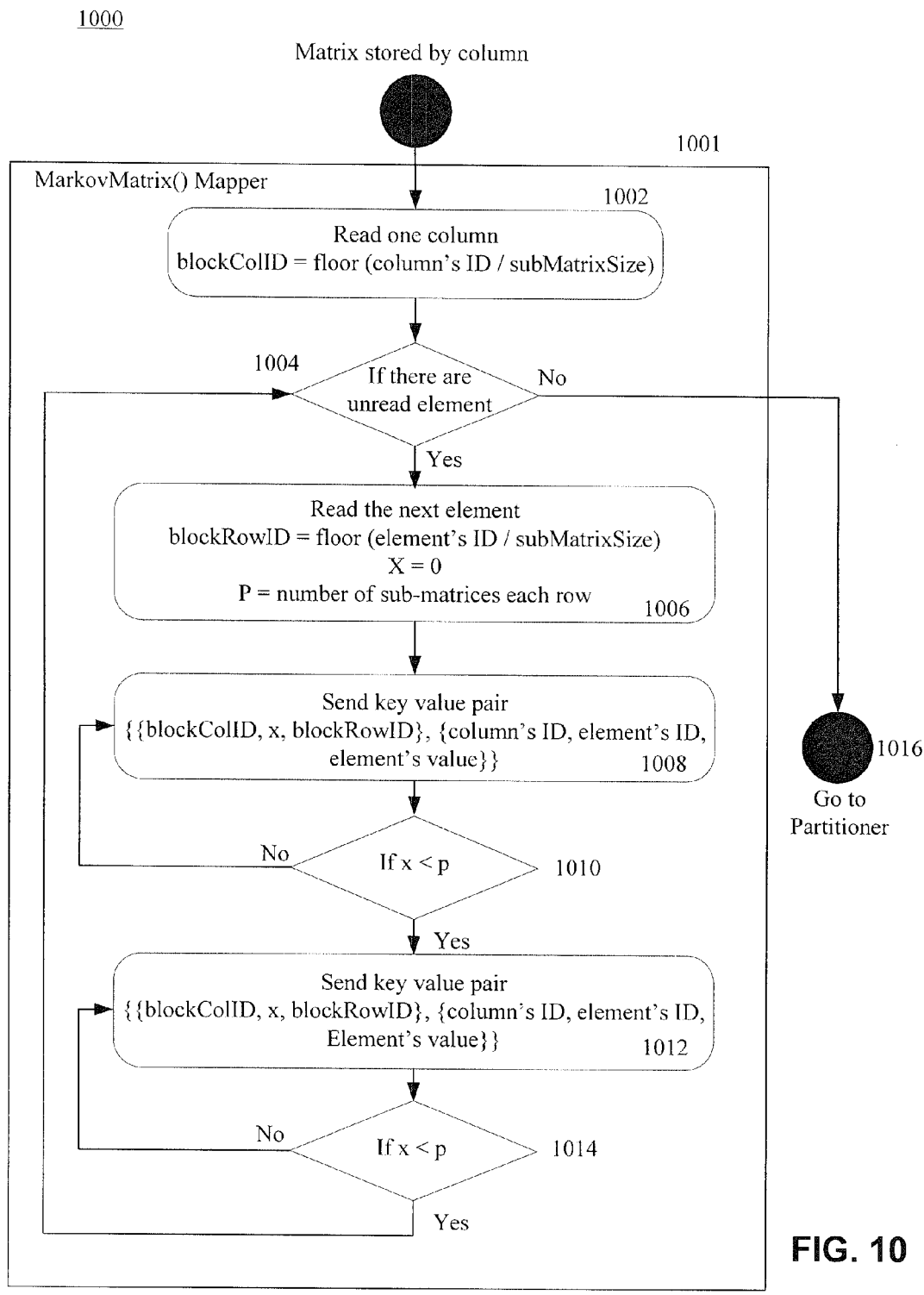
FIG. 10 is a diagram illustrating components and acts to implement an expansion mapper for an MCL algorithm using Map-Reduce, under an embodiment.

FIG. 10 is a diagram illustrating components and acts to implement an expansion mapper for an MCL algorithm using Map-Reduce, under an embodiment. This diagram illustrates in greater detail the processes executed by element 902 in FIG. 9. As shown in FIG. 10, the matrix stored by column is input to Markov Matrix Mapper component 1001. The mapper process 1001 reads one column and determines if the block column ID is equal to the floor value of the column IDs divided by the sub-matrix size, act 1002. Decision block 1004 determines whether or not there are any unread elements. If all elements have been read and processed, the process ends with act 1016 that transfers execution to the partitioner component. If in block 1004 it is determined that there are unread elements, the next element is read, and the values of the block row ID, x variable and p variable are set using, for example, one of the strategies described in algorithm 1.1, 2.2 or 2.3, act 1006. The key value pair is then sent, block 1008. In decision block 1010 it is determined if the value of variable x is less than the value of variable p. If it is not, the process repeats from act 1006. If x is less than p, then the key value pair is set, act 1012. Again the process determines if the value of variable x is less than the value of variable p, decision block 1014. If not, the process repeats from act 1012. If x is less than p in this case, the process goes back to determine if there are any remaining unread elements, decision block 1004. The process then repeats until all elements are processed after which processing is taken up by the partitioner.

Figure 11:
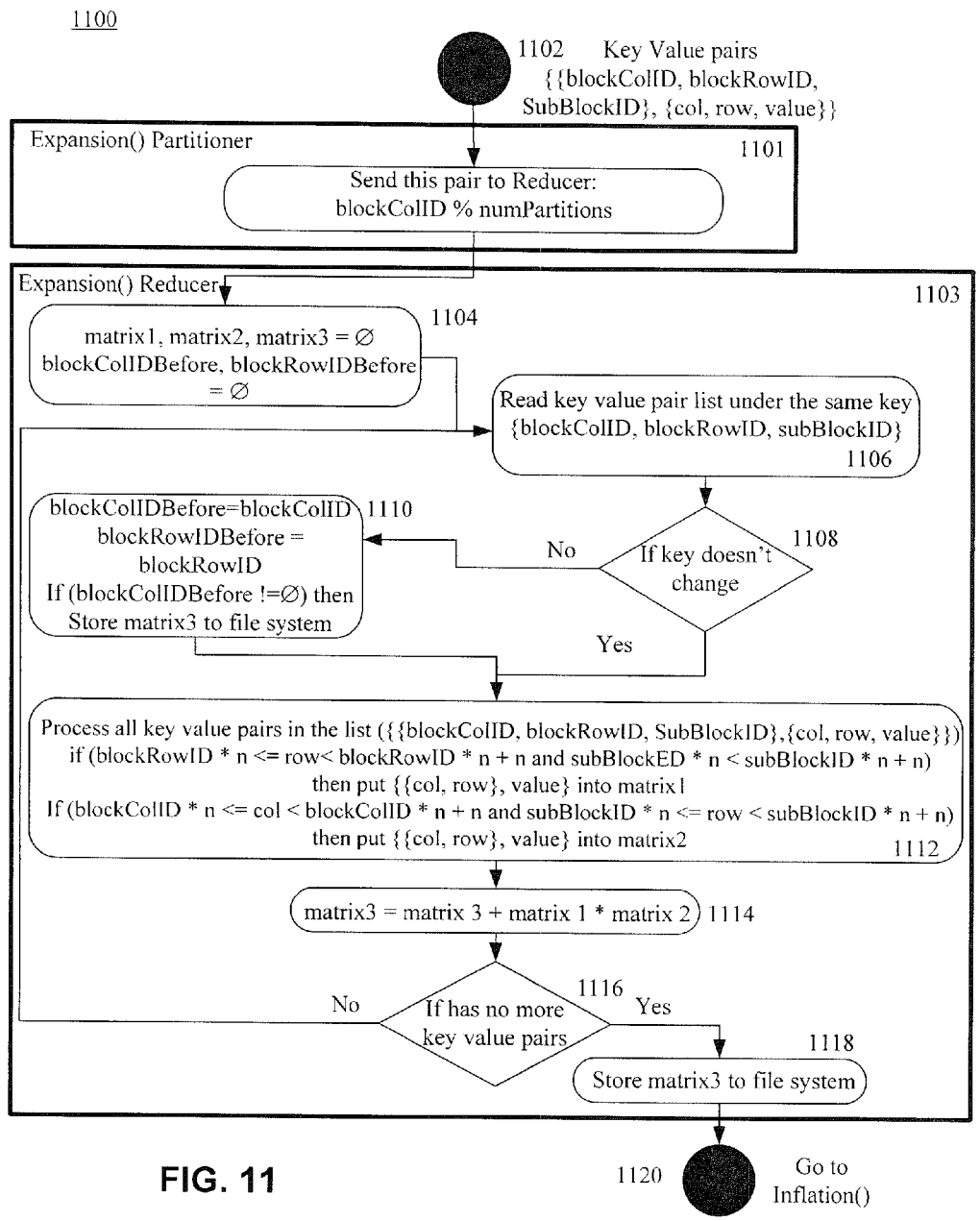
FIG. 11 is a diagram illustrating components and acts to implement an expansion partitioner and reducer for an MCL algorithm using Map-Reduce, under an embodiment.

FIG. 11 is a diagram illustrating components and acts to implement an expansion partitioner and reducer for an MCL algorithm using Map-Reduce, under an embodiment. As shown in FIG. 11, the key value pairs 1102 from the expansion mapper are input to a expansion partitioner component 1101 and to an expansion reducer component 1103. The expansion partitioner component 1101 sends the key value pair to the reducer 1103, which first sets the matrix values equal to zero, act 1104. The key value pair list is then read under the same key, act 1106. Decision block 1108 determines whether or not the key changes. If not, the block column ID is processed as shown in block 1110. All key values in the list are then processed as shown in block 1112. The value of a particular sub-matrix (e.g., matrix 3) is then set to the sum of matrix 3 added to the product of matrices 1 and 2, act 1114. Decision block 1116 then determines whether or not there are any remaining key value pairs. If there are remaining key value pairs, the process repeats from act 1106. Once all key value pairs have been processed, the sub-matrix (matrix 3) is saved to the file system, act 1118. At this point, the process is taken up by the inflation process, act 1120.

Figure 12:
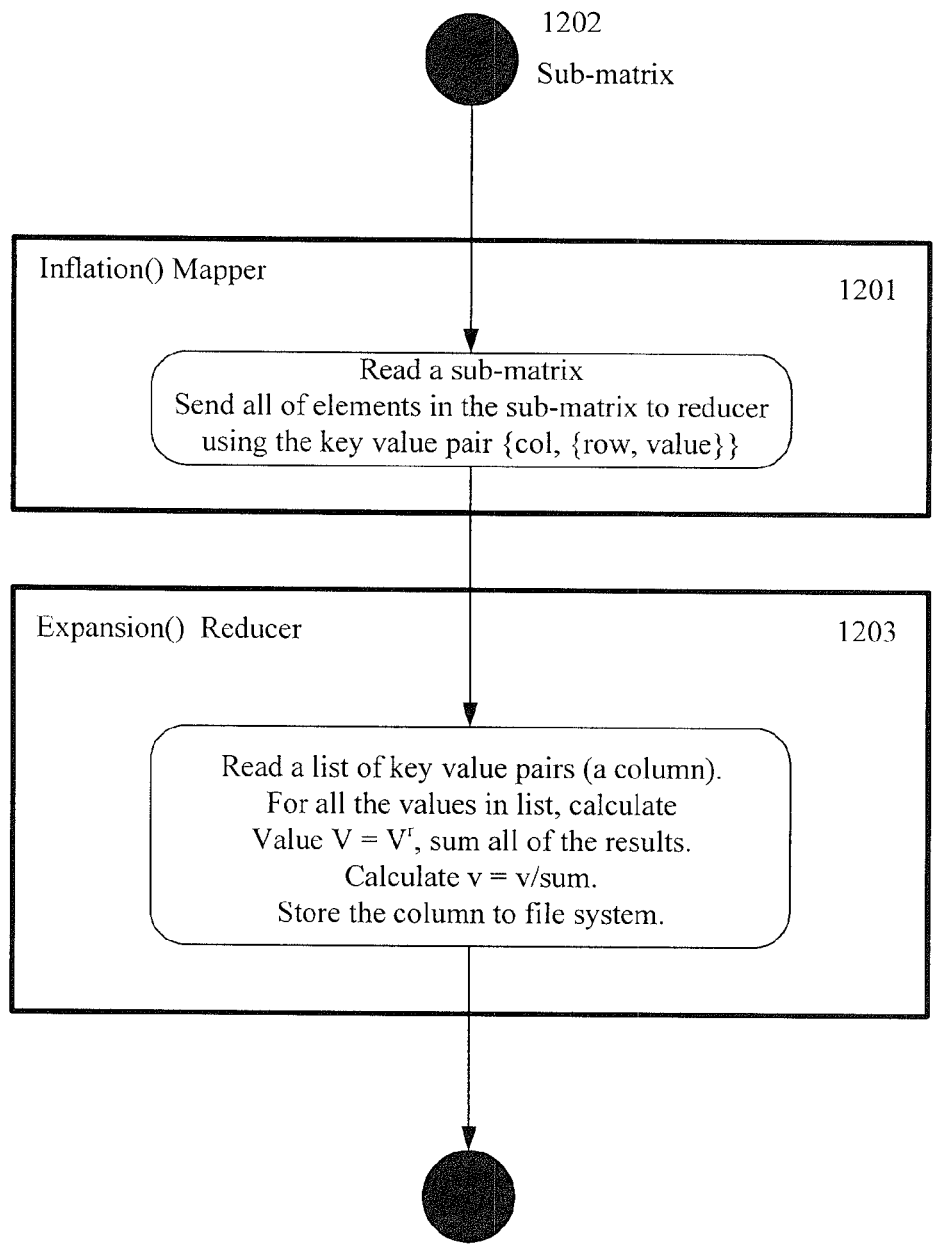
FIG. 12 is a diagram illustrating components and acts to implement an inflation mapper and reducer for an MCL algorithm using Map-Reduce, under an embodiment.

FIG. 12 is a diagram illustrating components and acts to implement an inflation mapper and reducer for an MCL algorithm using Map-Reduce, under an embodiment. The sub-matrix 1202 processed and stored by the partitioner is processed through an inflation mapper component 1202 and an expansion reducer component 1203. The inflation mapper 1201 reads the input sub-matrix and sends all elements of the sub-matrix to the reducer component 1203 using the appropriate key-value pair. The reducer 1203 reads a list of key value pairs and for all values in the list it calculates the value of the column and stores the result to the file system.

With social networks becoming popular, graph computation has become essential to maintain and process the information from the social network graphs, and discover potential features of the graph. When the number of social network users grows rapidly, the size of graph also grows ever larger to the point that it is impossible to process a huge graph on a single machine in a "real time" level execution time. One solution is to parallelize and distribute the graphs, and cloud computing platforms generally provide a good foundation for fast graph calculation. In an embodiment, the MCL algorithm is redesigned, implemented and evaluated using Map-Reduce model. While redesigning the MCL, several matrices multiplication methods are proposed which can be used universally. Embodiments are directed to an adaptation of graph-based algorithms to a Map-Reduce model. The MCL algorithm is implemented using Hadoop, and a new matrix multiplication method is developed while designing MCL.

Aspects of the system 100 may be implemented in appropriate computer network environment for processing large graph data, including a cloud computing environment in which certain network resources are virtualized and made accessible to the individual nodes through secure distributed computing techniques. The Map-Reduce system described herein can be implemented in an Internet based client-server network system. The network 100 may comprise any desired number of individual machines, including one or more routers (not shown) that serve to buffer and route the data transmitted among the computers. Network 100 may be built on various different network protocols, and may be the Internet, a Wide Area Network (WAN), a Local Area Network (LAN), or any combination thereof.

According to one embodiment, each machine of network 100 is operator configurable using applications, such as a web browser, including computer code run using a central processing unit. A computer program product embodiment includes a machine-readable storage medium (media) having instructions stored thereon/in, which can be used to program a computer to perform any of the processes of the embodiments described herein. Computer code for executing embodiments may be downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for processing graph data, the method comprising:
    executing a Markov Clustering algorithm (MCL) to find clusters of vertices of the graph data;
    organizing the graph data by column by calculating a probability percentage for each column of a similarity matrix of the graph data to produce column data;
    generating a probability matrix of states of the column data;
    performing an expansion of the probability matrix by computing a power of the probability matrix using a Map-Reduce model executed in a processor-based computing device; and
    organizing the probability matrix into a set of sub-matrices to find the least amount of data needed for the Map-Reduce model given that two lines of data in the probability matrix are required to compute a single value for the power of the probability matrix.

2. The method of claim 1 wherein the MCL simulates random walks of the graph data using matrices computations.

3. The method of claim 2 wherein the step of performing the expansion of the probability matrix comprises computing a Hadamard power of the matrix.

4. The method of claim 1 wherein generating the probability matrix comprises:
    performing a map function of the Map-Reduce model to read the similarity matrix in a column-by-column manner;
    calculating the probability value of each element of the similarity matrix;
    collecting a column ID or row ID as a key; and
    assigning a respective probability as a value.

5. The method of claim 4 further comprising:
    performing a reduce function of the Map-Reduce model that fetches all of the values under a same key; and
    writes new row and columns with corresponding probabilities values to a file system used by the computing device.

6. The method of claim 5 wherein the probability matrix is generated using a first strategy that uses all of the columns and rows of the similarity matrix and the power of the matrix is calculated using a defined matrix multiplication process, a result is collected using both the column ID as the key and the row ID and respective new probability value as the value, and wherein the reduce function obtains all values of a result by column ID.

7. The method of claim 5 wherein the probability matrix is generated using a second strategy that represents the probability data in column format only, organizing the similarity matrix into sub-blocks such that each sub-matrix referenced by a sub-block ID, and calculating the power of the matrix by multiplying sub-matrix pairs to calculate units of sub-matrices, and wherein the reduce function sums received units of the sub-matrices.

8. The method of claim 5 further comprising implementing a partitioner function to arrange a range of key values pairs generated by the map function to form input to a specific reduce function in order to facilitate calculation of sub-matrices in a single reduction step.

9. The method of claim 8 further comprising terminating the processing of graph data upon one of the following: upon a determination that no elements of the probability matrix are changed by further map function operations or reduce function operations, or upon a determination that a number of output records in the reduce function is equal to the number of vertices in the graph data.

10. The method of claim 1 further comprising implementing the Map-Reduce model using a Hadoop distributed file system platform.

11. A system for processing graph data in a distributed computing network coupling one or more server computers to a plurality of workstation computers, comprising:
   a first component executing a Markov Clustering algorithm (MCL) to find clusters of vertices of the graph data and organizing the graph data by column by calculating a probability percentage for each column of a similarity matrix of the graph data to produce column data; and
   a Map-Reduce component implemented on a Hadoop distributed file system to generate a probability matrix of states of the column data and performing an expansion of the probability matrix by computing a power of the probability matrix using, and to organize the probability matrix into a set of sub-matrices to find the least amount of data needed for the Map-Reduce model given that two lines of data in the probability matrix are required to compute a single value for the power of the matrix.

12. The system of claim 11 wherein the MCL simulates random walks of the graph data using matrices computations, and wherein the expansion of the probability matrix is performed by computing a Hadamard power of the matrix.

13. The system of claim 11 wherein a map function of the Map-Reduce model reads the similarity matrix in a column-by-column manner, calculates the probability value of each element of the similarity matrix, collects column ID or row ID as a key, and assigns a respective probability as a value.

14. The system of claim 13 wherein a reduce function of the Map-Reduce model fetches all of the values under a same key; and writes new row and columns with corresponding probabilities values to a file system used by the computing device.

15. The system of claim 14 wherein the probability matrix is generated using one of:
   a first strategy that uses all of the columns and rows of the similarity matrix and the power of the matrix is calculated using a defined matrix multiplication process, a result is collected using both the column ID as the key and the row ID and respective new probability value as the value, and wherein the reduce function obtains all values of a result by column ID; and
   a second strategy that represents the probability data in column format only, organizing the similarity matrix into sub-blocks such that each sub-matrix referenced by a sub-block ID, and calculating the power of the matrix by multiplying sub-matrix pairs to calculate units of sub-matrices, and wherein the reduce function sums received units of the sub-matrices.

16. The system of claim 15 further comprising a partitioner component to arrange a range of key values pairs generated by the map function to form input to a specific reduce function in order to facilitate calculation of sub-matrices in a single reduction step of the reducer component.

17. The system of claim 16 the processing of the graph data is terminated upon one of the following: upon a determination that no elements of the probability matrix are changed by further map function operations or reduce function operations, or upon a determination that a number of output records in the reduce function is equal to the number of vertices in the graph data.

18. The system of claim 17 wherein the Map-Reduce component is implemented on the plurality of workstations each performing respective calculations on the graph data and utilizing the distributed file system as coordinated by the one or more server computers.

19. A non-volatile, non-transitory machine-readable medium containing one or more sequences of instructions for processing large-scale graph data in a distributed computing environment through a computer network coupling client computers to a server computer, the instructions configured to cause a processor to:
   execute a Markov Clustering algorithm (MCL) to find clusters of vertices of the graph data;
   organize the graph data by column by calculating a probability percentage for each column of a similarity matrix of the graph data to produce column data;
   generate a probability matrix of states of the column data;
   perform an expansion of the probability matrix by computing a power of the probability matrix using a Map-Reduce model executed in a processor-based computing device; and
   organize the probability matrix into a set of sub-matrices to find the least amount of data needed for the Map-Reduce model given that two lines of data in the probability matrix are required to compute a single value for the power of the probability matrix.

20. The medium of claim 19 further comprising instructions configured to cause the processor to:
   perform a map function of the Map-Reduce model to read the similarity matrix in a column-by-column manner;
   calculate the probability value of each element of the similarity matrix;
   collect column ID or row ID as a key;
   assign a respective probability as a value;
   perform a reduce function of the Map-Reduce model that fetches all of the values under a same key; and
   write new row and columns with corresponding probabilities values to a file system used by the computing device.

21. The medium of claim 20 wherein the probability matrix is generated using one of: a first strategy that uses all of the columns and rows of the similarity matrix and the power of the matrix is calculated using a defined matrix multiplication process, a result is collected using both the column ID as the key and the row ID and respective new probability value as the value, and wherein the reduce function obtains all values of a result by column ID; or a second strategy that represents the probability data in column format only, organizing the similarity matrix into sub-blocks such that each sub-matrix referenced by a sub-block ID, and calculating the power of the matrix by multiplying sub-matrix pairs to calculate units of sub-matrices, and wherein the reduce function sums received units of the sub-matrices.

22. The medium of claim 21 further comprising instructions configured to cause the processor to arrange a range of key values pairs generated by the map function through a partitioner function to form input to a specific reduce function in order to facilitate calculation of sub-matrices in a single reduction step.

* * * * *